(12) United States Patent
Khafizov et al.

(10) Patent No.: US 11,140,266 B2
(45) Date of Patent: Oct. 5, 2021

(54) COMBINING MULTICLASS CLASSIFIERS WITH REGULAR EXPRESSION BASED BINARY CLASSIFIERS

(71) Applicant: Verizon Patent and Licensing Inc., Arlington, VA (US)

(72) Inventors: Farid Khafizov, Plano, TX (US); Vittal N. Gunturu, Coppell, TX (US); Charles A. Liscomb, Liverpool, NY (US); Travis R. McLaren, Southlake, TX (US); Wade W. Hiney, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 69 days.

(21) Appl. No.: 16/535,600

(22) Filed: Aug. 8, 2019

(65) Prior Publication Data

US 2021/0044697 A1    Feb. 11, 2021

(51) Int. Cl.
| H04M 3/00 | (2006.01) |
| H04M 3/51 | (2006.01) |
| G06N 20/10 | (2019.01) |
| G06K 9/62 | (2006.01) |
| G06F 40/20 | (2020.01) |

(52) U.S. Cl.
CPC .......... *H04M 3/5141* (2013.01); *G06F 40/20* (2020.01); *G06K 9/6256* (2013.01); *G06K 9/6267* (2013.01); *G06N 20/10* (2019.01)

(58) Field of Classification Search
CPC .............................. H04M 3/5141; G06N 20/10
USPC ....... 379/265.01–265.14, 266.01–266.1, 309
See application file for complete search history.

(56) References Cited

U.S. PATENT DOCUMENTS

| 6,253,169 | B1 * | 6/2001 | Apte ..................... G06F 16/355 704/9 |
| 2008/0101689 | A1 * | 5/2008 | Forman .................. G06K 9/623 382/159 |
| 2010/0138451 | A1 * | 6/2010 | Henkin ................... G06Q 30/02 707/803 |
| 2015/0113388 | A1 * | 4/2015 | Barrett .................... G06F 16/35 715/249 |
| 2017/0154495 | A1 * | 6/2017 | Sri ...................... G06Q 30/0201 |
| 2018/0276561 | A1 * | 9/2018 | Pasternack ............. G06N 20/20 |

\* cited by examiner

*Primary Examiner* — William J Deane, Jr.

(57) ABSTRACT

A computer device may include a memory storing instructions and processor configured to execute the instructions to obtain a text file generated based on a communication session; select topics for classifying communication sessions; and apply one or more trained machine learning models to the obtained text file to determine one or more most likely topics for the communication session. The processor may be further configured to apply regular expression binary classifiers, each associated with a different topic, to the obtained text file to determine a likelihood the communication session is associated with a particular topic; select a topic for the communication session based on the determined one or more most likely topics and the determined likelihood the communication session is associated with the particular topic; and classify the communication session based on the selected topic.

20 Claims, 9 Drawing Sheets

```
["REMOTE",
r'(clicker|remote)(\s+((\w+|\S+)\s+){0,5})(not working)',
r'(clicker|remote)(\s+((\w+|\S+)\s+){0,5})blinking',
r'(red light)(\s+((\w+|\S+)\s+){0,5})remote',
r'checking.{1,20}remote(\s+((\w+|\S+)\s+){0,5})issue',
r'(having issues)(\s+((\w+|\S+)\s+){0,5})remote',
r'(can\'t do anything)(\s+((\w+|\S+)\s+){0,5})remote']
```

| MODEL | TOPICS | | | | | | | | |
|---|---|---|---|---|---|---|---|---|---|
| | ACO | PHYS | CPE | WIFI | FIBER | ACCT | VIDEO | SCO | BILL | REMOTE |
| GRAD BOOST | 5% | 5% | 5% | 5% | 50% | 5% | 5% | 10% | 5% | 5% |
| SVM | 5% | 10% | 5% | 5% | 40% | 5% | 5% | 15% | 5% | 5% |
| DNN | 5% | 15% | 5% | 5% | 45% | 5% | 5% | 5% | 5% | 5% |

| MODEL | TOPICS | | | | | | | | |
|---|---|---|---|---|---|---|---|---|---|
| | ACO | PHYS | CPE | WIFI | FIBER | ACCT | VIDEO | SCO | BILL | REMOTE |
| GRAD BOOST | 10% | 10% | 10% | 10% | 10% | 10% | 10% | 10% | 10% | 10% |
| SVM | 5% | 10% | 15% | 15% | 15% | 10% | 10% | 5% | 5% | 10% |
| DNN | 10% | 10% | 15% | 5% | 10% | 10% | 10% | 10% | 10% | 10% |
| BINARY | 0 | 0 | 1 | 0 | 1 | 0 | 0 | 0 | 0 | 0 |

| MODEL | TOPICS | | | | | | | | |
|---|---|---|---|---|---|---|---|---|---|
| | ACO | PHYS | CPE | WIFI | FIBER | ACCT | VIDEO | SCO | BILL | REMOTE |
| GRAD BOOST | 0.43 | 0.31 | 0.04 | 0.33 | 0.35 | 0.09 | 0.83 | 0.25 | 0 | 0.67 |
| SVM | 0.4 | 0.28 | 0.02 | 0.43 | 0.38 | 0.04 | 0.73 | 0.08 | 0.07 | 0.62 |
| DNN | 0.3 | 0.13 | 0.04 | 0.21 | 0.01 | 0.15 | 0.59 | 0.07 | 0.07 | 0.45 |
| BINARY | 0.3 | 0.13 | 0.13 | 0.21 | 0.01 | 0.16 | 0.59 | 0.05 | 0.07 | 0.45 |

| MODEL | TOPICS | | | | | | | | |
|---|---|---|---|---|---|---|---|---|---|
| | ACO | PHYS | CPE | WIFI | FIBER | ACCT | VIDEO | SCO | BILL | REMOTE |
| GRAD BOOST | 5% | 30% | 30% | 5% | 5% | 5% | 5% | 5% | 5% | 5% |
| SVM | 5% | 30% | 5% | 30% | 5% | 5% | 5% | 5% | 5% | 5% |
| DNN | 5% | 5% | 30% | 30% | 5% | 5% | 5% | 5% | 5% | 5% |
| BINARY | 0 | 1 | 1 | 1 | 0 | 0 | 0 | 0 | 0 | 0 |

FIG. 8D

COMBINING MULTICLASS CLASSIFIERS WITH REGULAR EXPRESSION BASED BINARY CLASSIFIERS

BACKGROUND INFORMATION

Companies, government agencies, and/or other types of organizations may maintain a call center to handle customer telephone calls. If a customer calls the organization with a particular problem, question, or request, the customer may be directed to the call center. The call center may select a call center agent and transfer the call to the selected call center agent. The call center agent may assist the customer and may generate a report relating to the call. Processing and analyzing call center calls may provide various challenges.

DETAILED DESCRIPTION OF PREFERRED EMBODIMENTS

The following detailed description refers to the accompanying drawings. The same reference numbers in different drawings identify the same or similar elements.

A customer calling a customer service telephone number associated with a company, government agency, or another type of organization may be directed to a call center. The call center may connect the customer with a customer service agent and the customer service agent may assist the customer. During and/or after the telephone call with the customer, the customer service agent may generate a summary of the telephone call. The summary may include keywords and indications of the sentiment of the telephone call, any promises made by the agent during the call, and/or a topic of the telephone call. The indicated topic may be used, for example, to classify the telephone call. Classified calls may then be used for analysis, such as to determine a performance or customer satisfaction metric for a particular product or service.

However, manual topic selection for telephone calls by customer service agents may be inefficient and/or inconsistent. Thus, automation of topic prediction of agent-customer conversations may improve the efficiency of the customer service agents, generate more consistent classification of calls, and/or improve the efficiency and resource use of a call analysis system that classified the calls. Topic prediction may be performed using machine learning models that are trained as a multiclass classifier that classifies an input into one of multiple possible output classes. For example, a trained machine learning model may, given a particular input, generate a likelihood score for each of the possible output classes that indicates the likelihood that the particular input belongs to a particular one of the output classes. The output class associated with the highest likelihood score may then be selected as the class to which the particular input belongs.

However, training a machine learning model as a multiclass classifier may be difficult. For example, given a set of output classes, some output classes may be difficult to detect, especially when the number of output classes is large. Thus, no single machine learning model may be able to accurately detect all classes in a multiclass classification problem when the number of classes is large. Therefore, a combination of multiple machine learning models may be used to improve classification.

Implementations described herein relate to combining multiclass classifiers with regular expression based binary classifiers. Each topic may be associated with a set of regular expressions generated based on selected keywords and phrases for the topic. The set of regular expressions for a topic may be used as a binary classifier for the topic. The regular expression binary classifiers for particular topics may be used to disambiguate between a set of likely topics generated by one or more trained multiclass machine learning models.

For example, a computer device, included in a call analysis system, may be configured to obtain a text file generated based on a telephone call, such as a customer service telephone call; select topics for classifying telephone calls; and apply one or more trained machine learning models to the obtained text file to determine one or more most likely topics, of the selected topics, for the telephone call. The computer device may be further configured to apply a set of regular expression binary classifiers, each associated with a different topic, to the obtained text file to determine a likelihood the telephone call is associated with a particular topic; select a topic for the telephone call based on the determined one or more most likely topics and the determined likelihood the telephone call is associated with the particular topic; and classify the telephone call based on the selected topic.

The trained machine learning models may include one or more of a support vector machines (SVM) model, a gradient boosting model, a random forest model, a decision tree model, a naïve Bayes classifier model, a K-nearest neighbors classifier model, a maximum entropy classifier model, a kernel density estimation classifier model, a deep learning neural network (DNN) model (e.g., a recurrent neural network (RNN) model, such as a Long Term Short Memory (LSTM) neural network model, an attention mechanism neural network model, a Gated Recurrent Units (GRU) neural network model, an independently recurrent neural network (IndRNN) neural network model, a Neural Turing Machine (NTM) model, etc.), a Self-Organizing Map (SOM) model, and/or another type of machine learning model.

Applying the regular expression binary classifiers to the obtained text file may include selecting a particular regular expression binary classifier associated with a particular topic; obtaining regular expression patterns associated with the particular topic; and determining a number of regular expression pattern matches, from obtained regular expression patterns, in the obtained text file.

In some implementations, selecting the topic may include determining that a particular one of the one or more trained machine learning models has generated a likelihood score for a particular topic that is higher, by at least a threshold amount, than likelihood scores generated for all topics and selecting the particular topic for the telephone call.

Furthermore, in some implementations, selecting the topic may include determining performance scores for particular ones of the regular expression binary classifiers; determining that a particular regular expression binary classifier is associated with a performance score that is higher, by at least a threshold amount, than performance scores for all regular expression binary classifiers; and selecting the topic associated with the particular regular expression binary classifier.

Furthermore, in some implementations, selecting the topic may include determining a first set of performance scores for particular ones of the regular expression binary classifiers; determining a second set of performance scores for particular ones of the one or more trained machine learning models for particular topics; and selecting the topic based on comparing the first set of performance scores with the second set of performance scores. Comparing the first set of performance scores with the second set of performance scores may include calculating, for a particular topic, a ratio of a performance score, from the first set of performance scores, for a particular one of the regular expression binary classifiers associated with the particular topic, and a sum of performance scores, from the second set of performance scores, associated with the particular topic; and selecting the topic may include selecting the topic associated with a highest ratio.

The performance score may correspond to, for example, an F1 score (also known as an F-measure) that is based on a harmonic mean of precision and recall calculated for the particular regular expression binary classifier or a particular trained machine learning model.

In some implementations, the call analysis system may further determine a sentiment for the telephone call based on the generated text file, determine a promise associated with the telephone call based on the generated text file, and classify the telephone call further based on the determined sentiment and determined promise in addition to classifying the telephone call based on the selected topic.

Although particular implementations described herein refer to telephone calls, in other implementations, the communication between the customer and the agent may be performed via a video call. In yet other implementations, the communication between the customer and the agent may be performed via chat messages, instant messaging (IM) messages, Short Message Service (SMS) messages, and/or another type of communication that involves the exchange of text messages. In such implementations, a text file may be generated based on a set of text messages exchanged between the customer and the agent, rather than generating a text file based on an audio recording of a telephone call.

Figure 1:
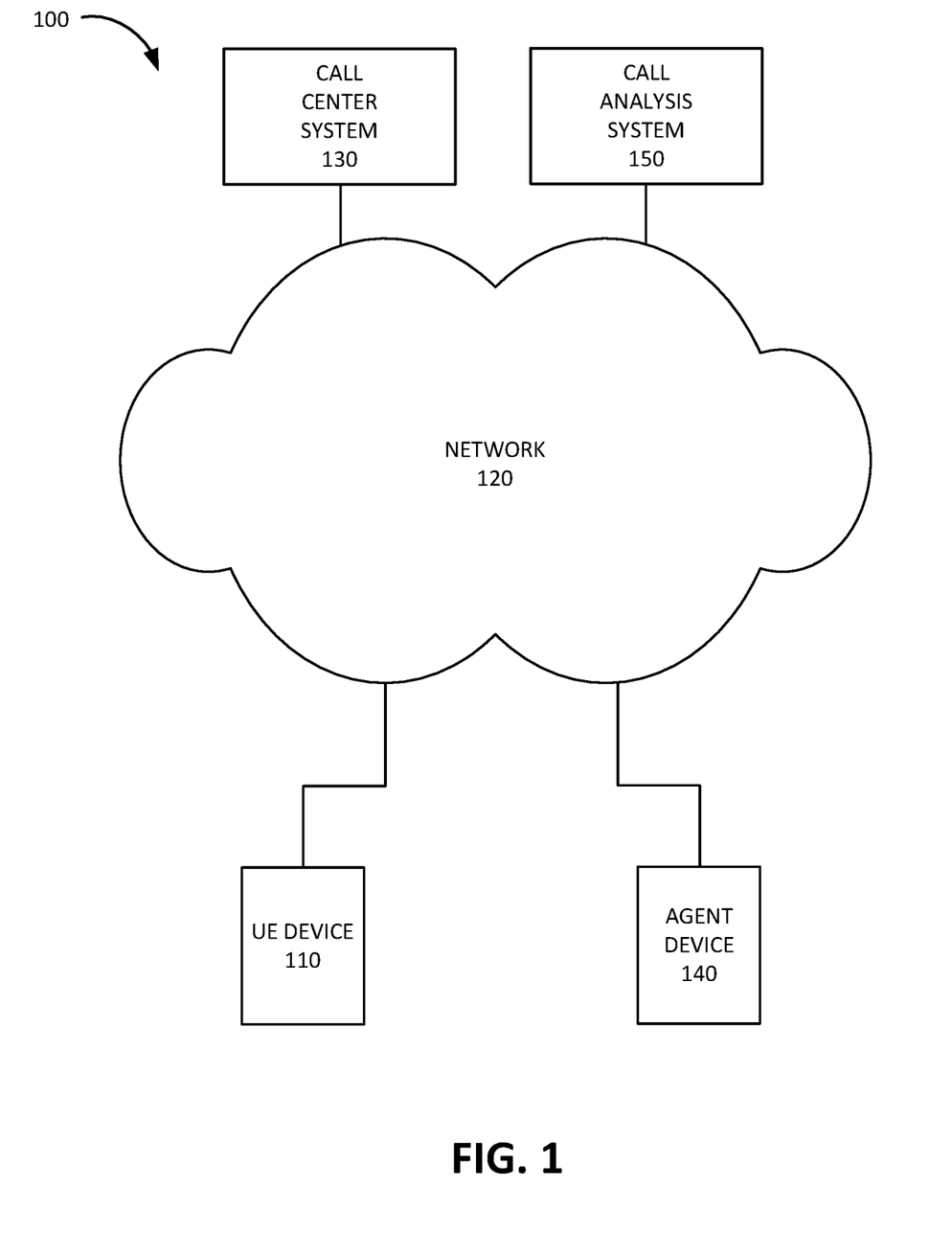
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include a user equipment (UE) device 110, a network 120, a call center system 130, an agent device 140, and a call analysis system 150. A customer may place a telephone call to call center system 130 and call center system 130 may establish a connection between UE device 110 and a customer service agent using agent device 140. Agent device 140 may then provide information relating to the call to call analysis system 150. While FIG. 1 depicts a single UE device 110 and single agent device 140 for illustrative purposes, in practice, environment 100 may include multiple UE devices 110 and/or agent devices 140.

UE device 110 and agent device 140 may each include any computer device capable of initiating and/or receiving telephone communications (e.g., voice calls, text messages, chat sessions, etc.) via a wired, optical, and/or wireless connection (e.g., using a cellular network via a base station (not shown in FIG. 1), a WiFi access point (not shown in FIG. 1), etc.) to network 120. For example, UE device 110 and/or agent device 140 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device. UE device 110 and/or agent device 140 may include capabilities for voice communication, mobile broadband services (e.g., video streaming, real-time gaming, premium Internet access etc.), best effort data traffic, and/or other types of applications.

Network 120 may include, and/or be connected to and enable communication with, a local area network (LAN), a wide area network (WAN), a metropolitan area network (MAN), an optical network, a cable television network, a satellite network, a wireless network (e.g., a Fourth Generation (4G) Long Term Evolution (LTE) network, an LTE Advanced (LTE-A) network, a Fifth Generation (5G) New Radio (NR) network, a Code Division Multiple Access (CDMA) network, a general packet radio service (GPRS) network, etc.), an ad hoc network, a telephone network (e.g., the Public Switched Telephone Network (PSTN) or a cellular network), an intranet, or a combination of networks.

Call center system 130 may include one or more devices, such as computer devices and/or server devices, which answer incoming communications from customers and route communications to customer service agents. For example, call center system 130 may include an interactive voice response (IVR) system that answers a call from UE device 110, plays an initial greeting, and prompts the customer using UE device 110, via played audio messages, to provide information to the IVR system. Call center system 130 may then select a particular customer service agent, associated with agent device 140, based on the provided information, and may route the call to agent device 140.

Call analysis system 150 may include one or more devices, such as computer devices and/or server devices, which analyze telephone calls received by agent device 140. For example, call analysis system 150 may receive information relating to a call from agent device 140 and/or from call center system 130, and may classify the call based on the received information. Call analysis system 150 may use one or more trained multiclass machine learning models and a set of regular expression binary classifiers to select a topic for the call from a set of topics, and classify the call based on the selected topic. In some implementations, call analysis system 150 may further determine a sentiment for the call and whether any promises were made by the customer service agent and further classify the call based on the determined sentiment and/or promises.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
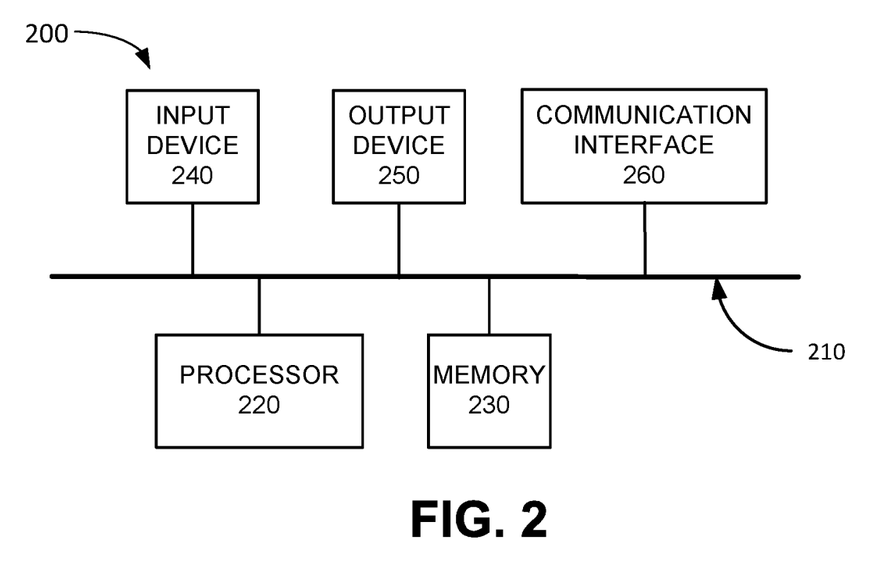
FIG. 2 is a diagram illustrating exemplary components of a device that may be included in a component of FIG. 1 according to an implementation described herein.

FIG. 2 illustrates example components of a device 200 according to an implementation described herein. UE device 110, call center system 130, agent device 140, and/or call analysis system 150 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to classifying telephone calls, and/or other types of communications, based on topics. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
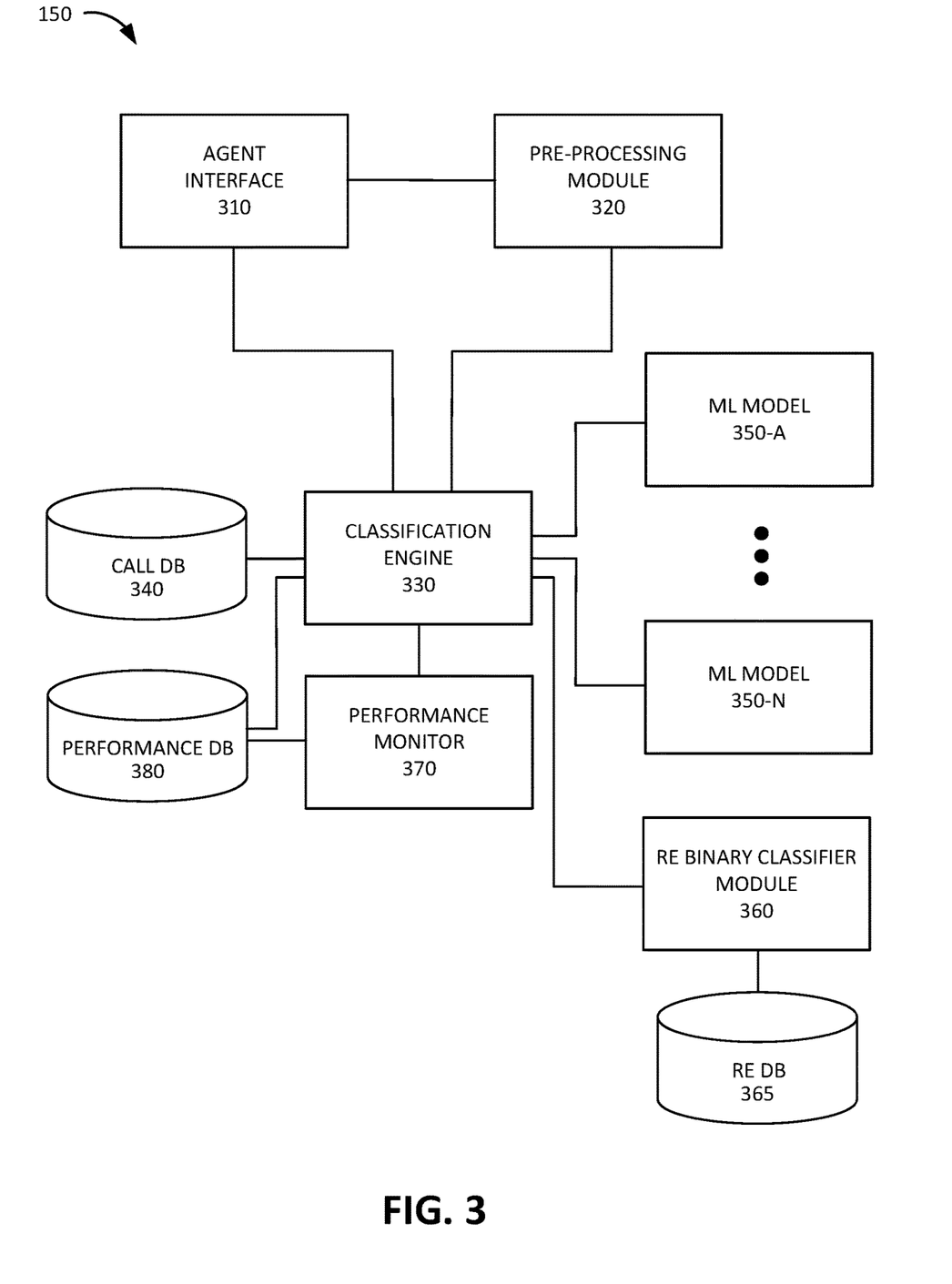
FIG. 3 is a diagram illustrating exemplary components of the call analysis system of FIG. 1 according to an implementation described herein.

FIG. 3 is a diagram illustrating exemplary components of call analysis system 150. The components of call analysis system 150 may be implemented, for example, via processor 220 executing instructions from memory 230. Alternatively, some or all of the components of call analysis system 150 may be implemented via hard-wired circuitry. As shown in FIG. 3, call analysis system 150 may include an agent interface 310, a pre-processing module 320, a classification engine 330, a call database (DB) 340, machine learning (ML) models 350-A to 350-N, a regular expression (RE) binary classifier module 360, an RE DB 365, a performance monitor 370, and a performance DB 380.

Agent interface 310 may be configured to interface with agent device 140. For example, agent device 140 may record a customer service call with a customer using UE device 110 and may provide a recording of the call, along with other information associated with the call, to call analysis system 150 using agent interface 310. The other information may include, for example, notes and/or comments created by the agent during or after the call.

Pre-processing module 320 may perform pre-processing on the recorded telephone call. For example, pre-processing module may generate a text file from the recorded audio of the telephone call using a speech-to-text process. In some implementations, the speech-to-text processing may be performed by call analysis system 150. In other implementations, pre-processing module 320 may send the recorded audio to a remote device (e.g., a device running a third-party speech-to-text application, etc.). Furthermore, pre-processing module 320 may perform annotation to add one or more labels to the generated text file based on comments/notes made by the agent, may perform keyword and/or phrase identification on the generated text file, and/or may perform other types of pre-processing on the generated text file. The generated text file, and/or information relating to the generated text file, my be stored in call DB 340.

Classification engine 330 may select a topic for a telephone call, based on the generated text file using ML models 350-A to 350-N and/or RE binary classifier module 360, and store information relating to the selected topic in call DB 340. Exemplary information that may be stored in call DB 340 is described below with reference to FIG. 4. Classification engine 330 may obtain likelihood scores for each of a set of topics using each of the ML models 350-A to 350-N. Furthermore, classification engine 330 may determine the number of matches for each topic using a RE binary classifiers that use a set of RE expressions for each topic. Moreover, classification engine 330 may obtain performance scores for ML models 350-A to 350-N and for RE binary classifiers associated with particular topics and may select a topic from a set of matching topics based on which RE binary classifier is associated with the highest performance score.

Each ML model 350 may include a particular type of multiclass ML model trained to classify an input text file into a topic from a set of topics for customer service telephone calls. For example, ML model 350 may include an SVM model, a gradient boosting model, a random forest model, a decision tree model, a naïve Bayes classifier model, a K-nearest neighbors classifier model, a maximum entropy classifier model, a kernel density estimation classifier model, a deep learning neural network model, a SOM model, and/or another type of machine learning model. ML models 350 may be trained, for example, on text files generated from telephone calls that have been manually tagged with a particular topic label.

RE binary classifier module 360 may implement a RE binary classifier for a particular topic by determining how many regular expression matches for the particular topic are made for a text file generated from a telephone call using a set of regular expressions associated with the particular topic and stored in RE DB 365. Thus, RE DB 365 may store a set of regular expressions for each topic. The regular expressions for a particular topic may be generated based on keywords and phrases manually selected for the particular topic by a subject matter expert.

Performance monitor 370 may generate a performance score for each ML model 350 for each topic and a performance score for each RE binary classifier and store the generated performance scores in performance DB 380. Thus, performance DB 380 may store a performance table that includes a performance score for each ML model 350 for each topic and a performance score for each RE binary classifier.

For example, the performance score may correspond to an F1 score. An F1 score may correspond to a harmonic mean of the precision and recall for the generated output over a set of inputs. The precision P may correspond to the ratio of true positives tp identified by a classifier from an input set to the total number of positives (i.e., true positives tp plus false positives fp) identified by the classifier from the input set. Recall R may correspond to the ratio of the true positives identified by the classifier from the input set to the total number of relevant elements (i.e., true positives tp plus false negatives fn) in the input sample.

Thus, $$P = \frac{tp}{tp + fp}, \text{ and } R = \frac{tp}{tp + fn}.$$

The F1 score may then be computed as:

$$F1 = \left(\frac{R^{-1} + P^{-1}}{2}\right)^{-1} = 2 * \frac{P * R}{P + R} \qquad \text{Eq. (1)}$$

The F1 score may be computed for ML models 350, and for the RE binary classifiers associated with particular regular expression sets corresponding to particular topics, using, for example, a validation set that includes labeled text files, generated from telephone calls, that have been manually tagged with a particular topic label.

In addition to computing the F1 scores, performance monitor 370 may compute an F1 ratio for each RE binary classifier and store the computed F1 ratio in performance DB 380. The F1 ratio for a particular RE binary classifier, associated with a particular topic, may be computed as:

$$F1R_T = \frac{F1_T}{\sum_{i=1}^{n} F1_{ML_iT}} \qquad \text{Eq. (2)}$$

where $F1R_T$ represented the F1 ratio for the RE binary classifier for topic T, $F1_T$ represents the F1 ratio for the RE classifier for topic T, and $F1_{ML_{iT}}$ represents the F1 score for i-th ML model for topic T. The F1 ratio may be used by classification engine 330 to select the best topic for a telephone call when classification engine 330 is not able to disambiguate between multiple topics based on matched identified by RE binary classifiers.

In other implementations, a performance score different from the F1 score may be used. For example, while the F1 score gives an equal weight to precision and recall, in other implementations, a performance score that gives more weight to precision, or a performance score that gives more weight to recall, may be used.

Although FIG. 3 shows exemplary components of call analysis system 150, in other implementations, call analysis system 150 may include fewer components, different components, additional components, or differently arranged components than depicted in FIG. 3. Additionally, or alternatively, one or more components of call analysis system 150 may perform one or more tasks described as being performed by one or more other components of call analysis system 150.

Figure 4:
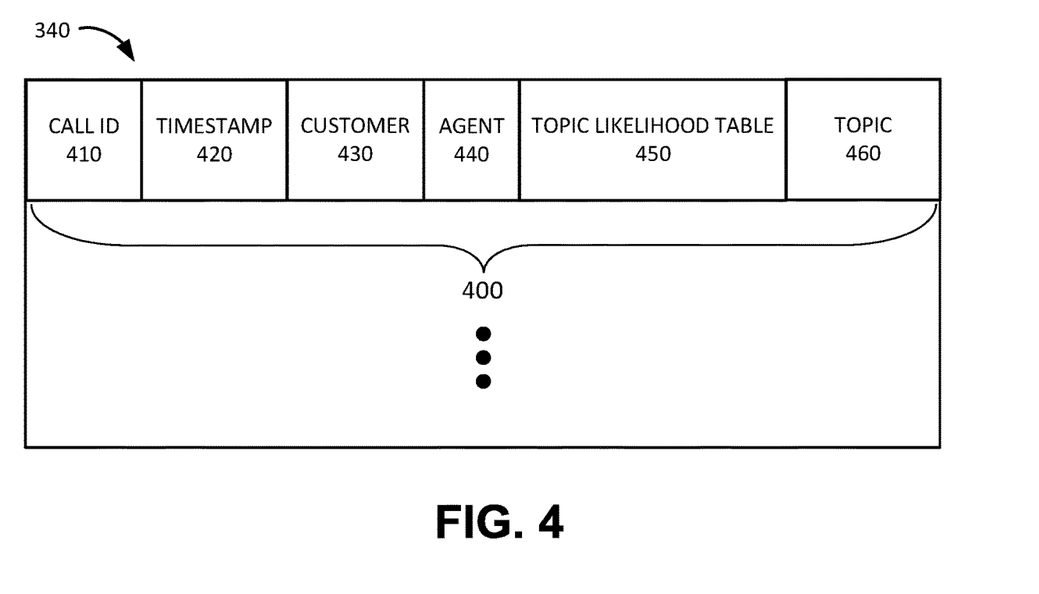
FIG. 4 is a diagram illustrating exemplary components of the call database of FIG. 3 according to an implementation described herein.

FIG. 4 is a diagram illustrating exemplary components of call DB 340. As shown in FIG. 4, call DB 340 may include on or more call records 400. Each call record 400 may store information relating to a particular call analyzed by call analysis system 150. Call record 400 may include a call identifier (ID) field 410, a timestamp field 420, a customer field 430, an agent field 440, a topic likelihood table field 450, and a topic field 460.

Call ID field 410 may include a unique ID associated with a particular call. Furthermore, call ID field 410 may store, or point to, the generated text file associated with the particular call. Timestamp field 420 may include one or more timestamps associated with the particular call. For example, timestamp field 420 may include a start time and an end time for the particular call. Customer field 430 may identify a customer associated with the particular call. For example, customer field 430 may include an account number associated with the customer and/or an ID associated with UE device 110. Agent field 440 may include an agent ID associated with the customer service agent using agent device 140 and/or an ID associated with agent device 140.

Topic likelihood table field 450 may store a likelihood table that includes likelihood scores determined by particular multiclass machine learning models for particular topics. For example, a likelihood score for a topic may indicate a percentage score that indicates the percentage likelihood that an input text file is associated with the topic. Furthermore, likelihood table field 450 may include a value for each topic that indicates the number of regular expression matches determined by a RE binary classifier for the topic based on a set of regular expressions associated with the topic. Topic field 460 may include information identifying a topic selected for the particular call by classification engine 330 based on the information stored in topic likelihood table field 450 and/or based on the information stored in performance DB 380.

Although FIG. 4 shows exemplary components of call DB 340, in other implementations, call DB 340 may store fewer components, different components, additional components, or differently arranged components than depicted in FIG. 4.

Figure 5:
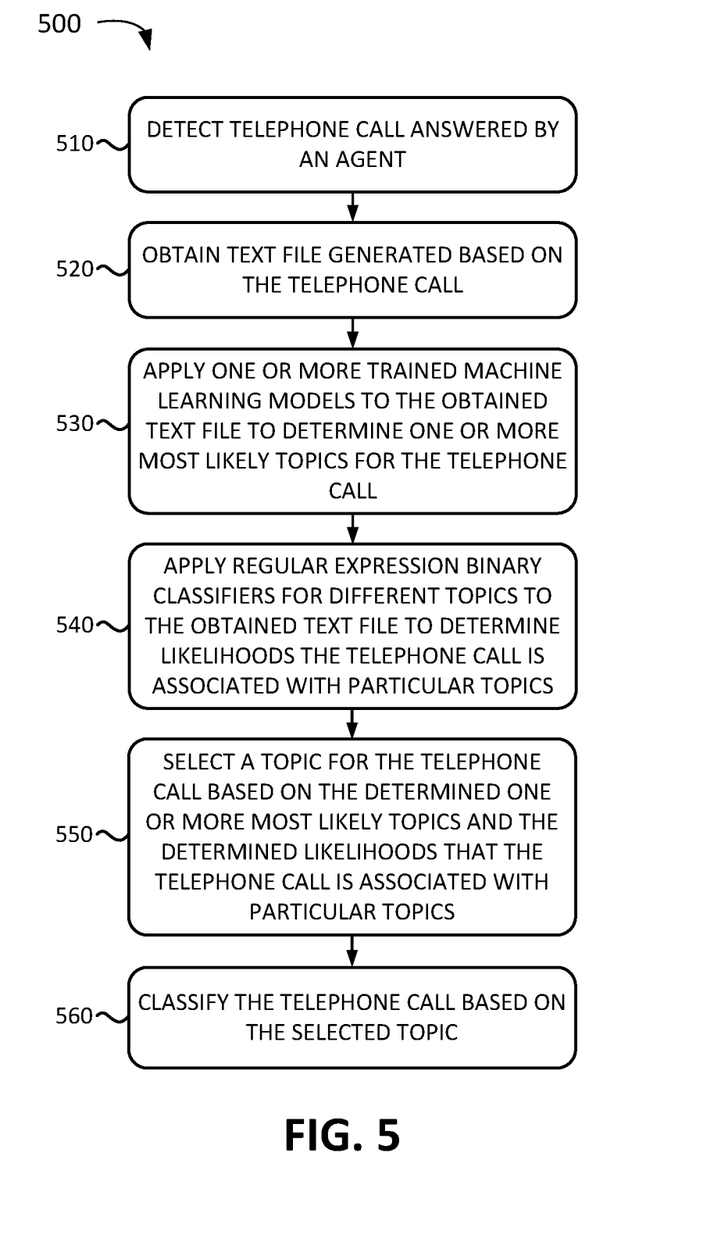
FIG. 5 is a flowchart of a process of classifying a call according to an implementation described herein.

FIG. 5 is a flowchart of a process of classifying a call according to an implementation described herein. In some implementations, the process of FIG. 5 may be performed by call analysis system 150. In other implementations, some or all of the process of FIG. 5 may be performed by another device or a group of devices separate from call analysis system 150.

The process of FIG. 5 may include detecting a telephone call answered by an agent (block 510) and obtaining a text file generated based on the telephone call (block 520). For example, agent device 140 may upload a recorded audio file of a telephone call to call analysis system 150 and call analysis system 150 may obtain a text file generated based on the telephone call. As an example, pre-processing module 320 may use a remote text-to-speech application or service to generate a text file based on the recorded audio file. As another example, pre-processing module 320 may include text-to-speech capability and may generate the text file locally. Furthermore, pre-processing module 320 may annotate the text file based on notes provided by the agent and/or may perform keyword and phrase detection on the generated text file.

One or more trained machine learning models may process the obtained text file to determine one or more most likely topics for the telephone call (block 530). For example, classification engine 330 may use ML models 350 to generate likelihood scores for particular topics for the obtained text file. The likelihood scores may be stored in topic likelihood table field 450 of the call record 400 associated with the call.

Regular expression binary classifiers for different topics may be applied to the obtained text file to determine likelihoods that the telephone call is associated with particular topics (block 540). For example, RE binary classifier module 360 may obtain a set of regular expressions for a particular topic and determine whether there are any matches in the obtained text file for the set of regular expressions. The number of matches for each topic may be stored in topic likelihood table field 450 of the call record 400 associated with the call.

A topic may be selected for the telephone call based on the determined one or more most likely topics and the determined likelihoods that the telephone call is associated with particular topics (block 550). An exemplary process for selecting a topic using the determined one or more most likely topics and the determined likelihoods that the telephone call is associated with particular topics is described below with reference to FIG. 6.

The telephone call may be classified based on the selected topic (block 560). For example, classification engine 330 may classify the telephone call into a particular classification category based on the selected topic. In some implementations, classification engine 330 may use additional criteria for classifying the telephone call. For example, classification engine 330 may obtain the results of a sentiment analysis and/or one or more detected promises associated with the telephone call and use a sentiment and or a detected promise to further classify the telephone call. For example, a promise may include a promise to credit the customer's account due to a service problem, a promise to restore a particular service within a particular time period, a promise to send a technician to the customer's location within a particular time period, etc. In some implementations, an agent may annotate a telephone call with an indication of a sentiment and/or any promises made by the agent to the customer during the telephone call. Additionally, or alternatively, classification engine 330 may use a sentiment analysis engine and/or a promise detection engine to identify the sentiment and/or detect promises associated with the telephone call. In some implementations, classification engine 330 may include a sentiment analysis engine and/or a promise detection engine. In other implementations, classification engine 330 may use a remote sentiment analysis engine and/or a remote promise detection engine (e.g., by using a third-party Application Programming Interface (API) for a sentiment analysis service and/or a promise detection service).

Figure 6:
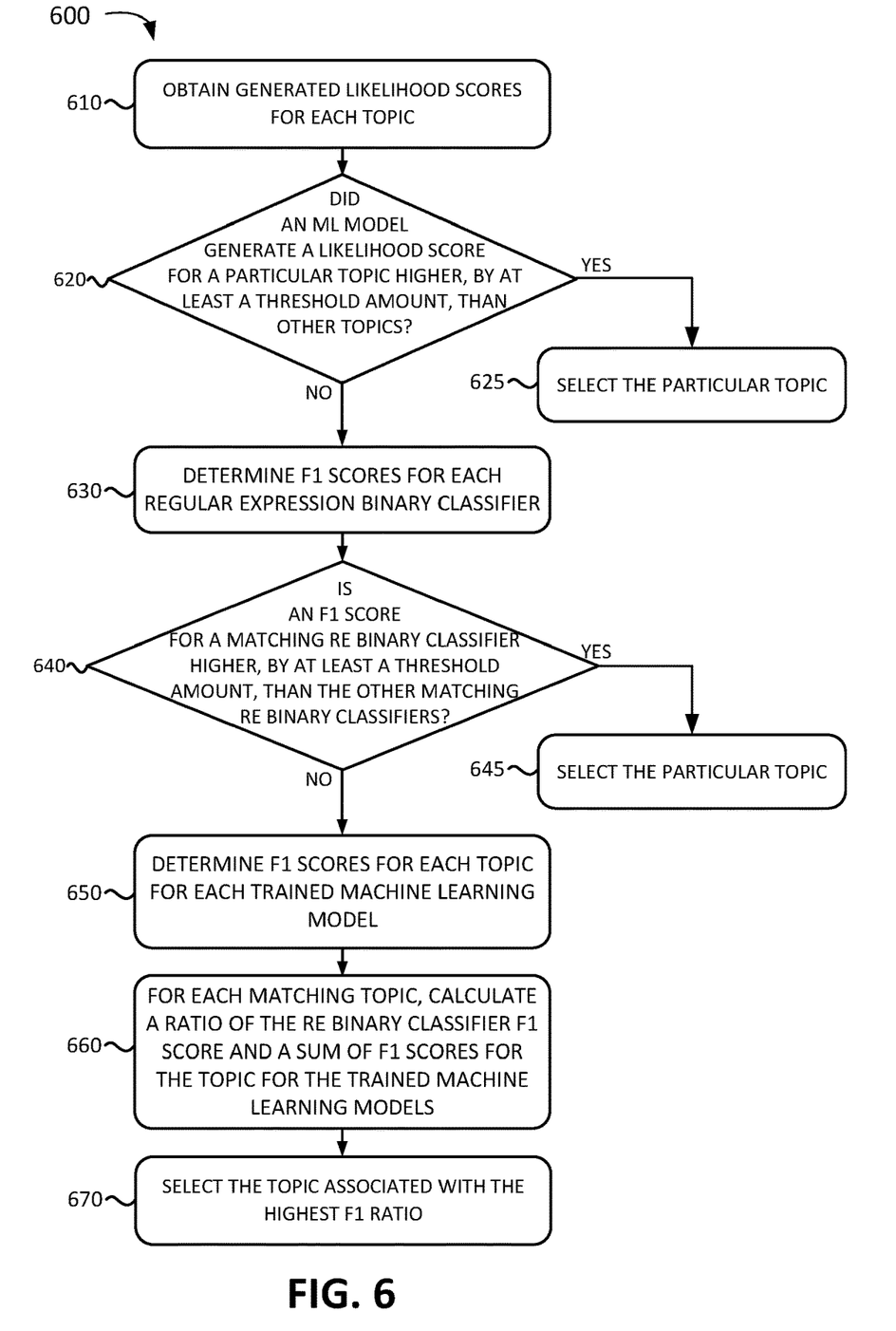
FIG. 6 is a flowchart of a process of selecting a topic for call according to an implementation described herein.

FIG. 6 is a flowchart of a process of selecting a topic for a call according to an implementation described herein. In some implementations, the process of FIG. 6 may be performed by call analysis system 150. In other implementations, some or all of the process of FIG. 6 may be performed by another device or a group of devices separate from call analysis system 150.

The process of FIG. 6 may include obtaining generated likelihood scores for each topic (block 610). For example, classification engine 330 may retrieve topic likelihood table field 450 associated with a particular call. Classification engine 330 may determine whether a machine learning model generated a likelihood score for a particular topic that is higher, by at least a threshold amount, than likelihood scores generated for other topics (block 620). If classification engine 330 determines that a machine learning model generated a likelihood score for a particular topic that is higher, by at least a threshold amount, than likelihood scores generated for other topics (block 620—YES), the particular topic may be selected (block 625). For example, classification engine 330 may determine whether likelihood table field 450 includes a likelihood score for a topic for any ML model 350 that is higher, by at least a threshold amount, than likelihood scores generated by the ML model 350 for other topics. If a likelihood score for a topic is sufficiently higher than other topics for a particular ML model 350, then the particular ML model 350 may be considered to have accurately predicted the topic and the predicted topic may be selected. In some implementations, the predicted topic may be selected if at least a particular number of ML models 350 (e.g., more than one) generated a likelihood score for a particular topic that is higher, by at least a threshold amount, than likelihood scores generated for other topics.

If classification engine 330 determines that no machine learning model generated a likelihood score for a particular topic that is higher, by at least a threshold amount, than likelihood scores generated for other topics (block 620—NO), an F1 score for each RE binary classifier may be determined (block 630). A determination may be made as to whether an F1 score for a matching RE binary classifier is higher, by at least a threshold amount, than the F1 scores for all other matching RE binary classifiers (block 640). If it is determined that an F1 score for a matching RE binary classifier is higher, by at least a threshold amount, than the F1 scores for all other matching RE binary classifiers (block 640—YES), the particular topic may be selected (block 645). For example, classification engine 330 may access performance DB 380 and determine the performance score for each RE binary classifier to determine whether a particular RE binary classifier is associated with a higher F1 score than all other RE binary classifiers. If an F1 score for a particular matching RE binary classifier is sufficiently higher than other RE binary classifiers, then the particular matching RE binary classifier may be considered to have accurately predicted the topic associated with the particular matching RE binary classifier, and the predicted topic may be selected.

If it is determined that no F1 scores for any of the matching RE binary classifiers are higher, by at least a threshold amount, than the F1 scores for all other matching RE binary classifiers (block 640—NO), for each matching topic, F1 scores for each topic for each trained machine learning model may be determined (block 650), a ratio may be calculated of the F1 score for the RE binary classifier associated with the topic and the sum of the F1 scores for the trained multiclass machine learning models for the topic (block 660), and the topic associated with the highest calculated ratio may be selected (block 670). For example, classification engine 330 may access performance DB 380 and calculate the F1 ratio for each topic using Equation (2) above. Thus, if the F1 scores for the regular expressions matches for different topics are not able to distinguish between multiple matching topics, the calculated F1 ratios may be used to select the most likely topic.

Figure 7:
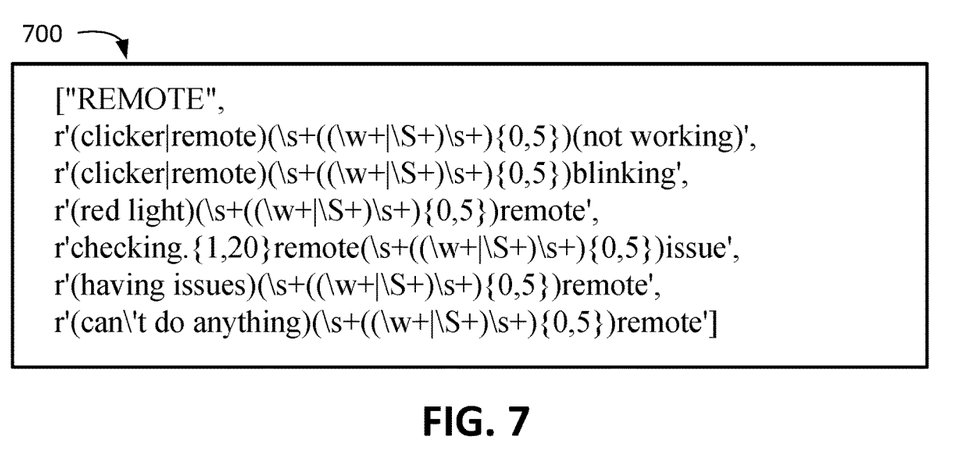
FIG. 7 is a diagram illustrating an exemplary regular expression according to an implementation described herein.

FIG. 7 is a diagram illustrating an exemplary regular expression 700. Regular expression 700 may be associated with a "remote control" topic that indicates that a customer service telephone call to a provider of video content relates to the customer experiencing a problem with a remote control device. Regular expression 700 may be applied to a text file associated with a telephone call to determine whether there are any matches for regular expression 700 in the text file. If a match is identified in the text file for regular expression 700 by RE binary classifier module 360, RE binary classifier module 360 may classify the telephone call associated with the text file in the "remote control" topic.

Figure 8A:
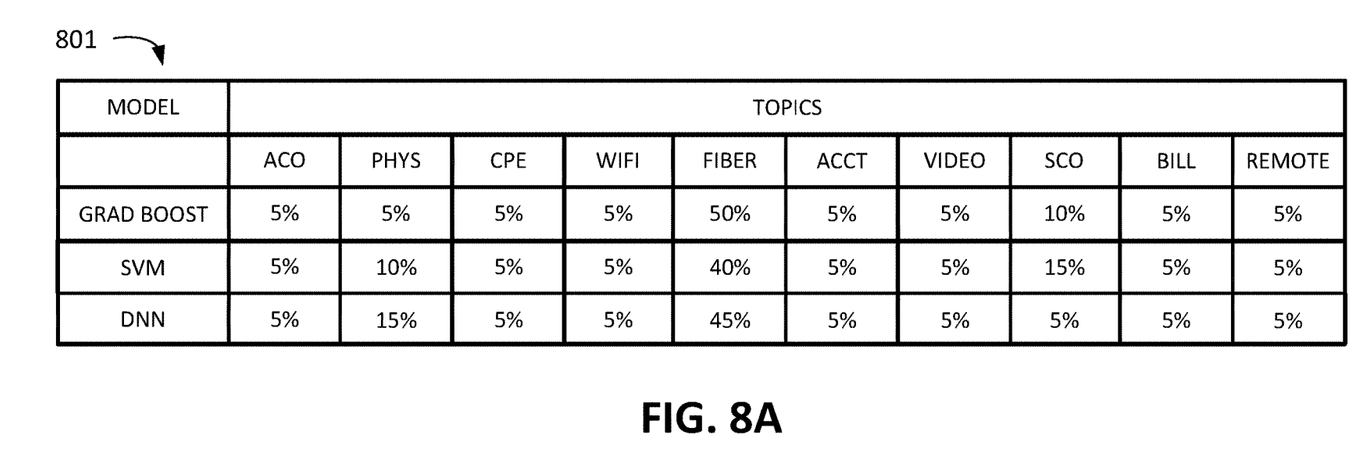
FIG. 8A illustrates a first exemplary likelihood table according to an implementation described herein.

FIG. 8A illustrates a first exemplary likelihood table 801 that may be stored in call DB 340. As shown in FIG. 8A, likelihood table 801 includes likelihood scores for three different multiclass machine learning models 350: a gradient boosting (grad boost) model, an SVM model, and a DNN model for ten different topics into which a customer service call for a provider of communication and video content delivery services may be classified. The topics may include an "all channels out" (ACO) topic that indicates a customer is experiencing connection issues with all communication channels available via the provider, a "physical" (PHYS) topic that indicates that the customer has experienced physical damage to wires associated with a device managed by the provider, a "customer premises equipment" (CPE) topic that indicates that the customer is experiencing a problem with CPE equipment, such as a router or a set-top box, a "WiFi" (WIFI) topic that indicates that the customer is experiencing a problem with a WiFi access point device, an "optical fiber" (FIBER) topic that indicates that the customer is experiencing a problem with an optical fiber connection, an "account" (ACCT) topic that indicates that the customer is experiencing a problem accessing account information, a "video" (VIDEO) topic that indicates that the customer is experiencing a problem with video content streaming, a "some channels out" (SCO) topic that indicates that the customer is experiencing connection issues with some communication channels available via the provider, a "billing" (BILL) topic that indicates that the customer is experiencing a problem with a bill, and a "remote control" (REMOTE) topic that indicates that the customer is experiencing a problem with a remote control device associated with a set-top box managed by the provider.

Likelihood table 801 illustrates an example in which a topic may be unambiguously determined based on one or more multiclass classifiers. For example, the gradient boosting model may generate a likelihood score of 50% for the FIBER topic, the SVM model may generate a likelihood score of 40% for the FIBER topic, and the DNN model may generate a likelihood score of 45% for the FIBER topic. Thus, since at least one multiclass machine learning model has generated a likelihood score for a topic that is higher than likelihood scores generated for all other topics by at least a threshold amount (e.g., by at least 20%), classification engine 330 may select the "optical fiber" as the topic for the telephone call associated with likelihood table 801. Thus, in this case, the use of RE binary classifiers may not be needed.

Figure 8B:
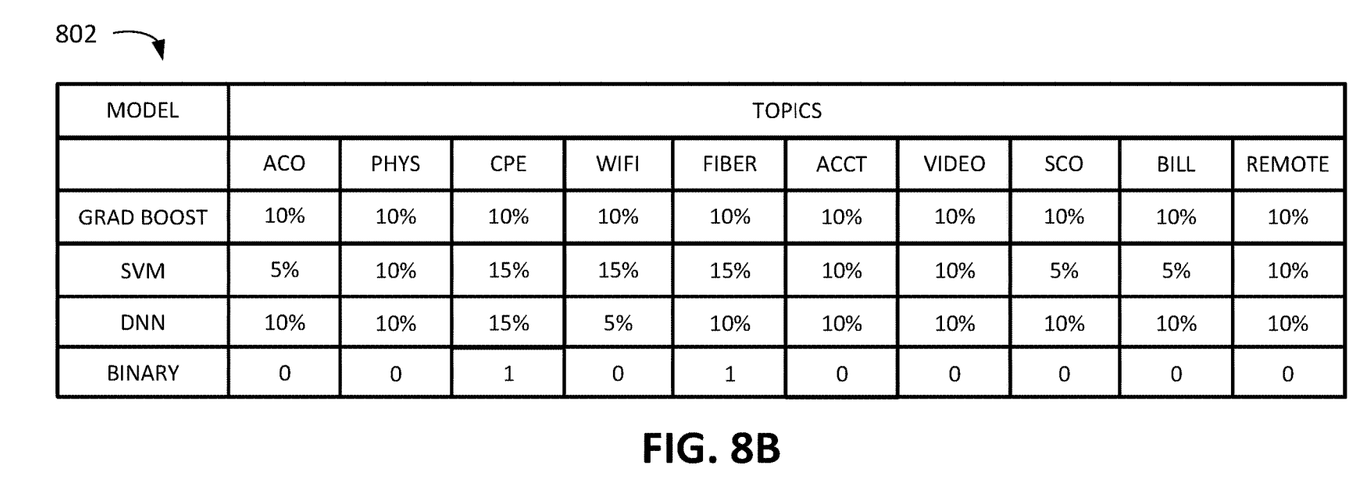
FIG. 8B illustrates a second exemplary likelihood table according to an implementation described herein.

FIG. 8B illustrates a second exemplary likelihood table 802 that may be stored in call DB 340. Likelihood table 802 illustrates an example of a telephone call in which no multiclass machine learning model 350 generates a likelihood score for any topic that is higher than likelihood scores for all other topics. As shown in FIG. 8B, likelihood table 802 includes likelihood scores for the gradient boosting machine learning model, the SVM machine learning model, and the DNN machine learning model, as well as the number of RE patterns detected by RE binary classifiers for each topic. Since no multiclass machine learning model is able to successfully predict the topic for the telephone call (e.g., no likelihood score for a topic is higher than likelihood scores for all other topics by the threshold amount), classification engine 330 may use RE binary classifier module 360 to determine which RE binary classifiers have detected RE matches. In the example of likelihood table 802, RE binary classifier module 360 has detected a match for the CPE topic and a match for FIBER topic. Thus, in order to select between the CPE topic and the FIBER topic, RE binary classifier module 360 may need to determine which RE binary classifier (i.e., the RE binary classifier for the CPE topic or the RE binary classifier for the FIBER topic) is associated with a higher performance. Thus, classification engine 330 may access performance DB 380 to select the stronger RE binary classifier, as described in detail below.

Figure 8C:
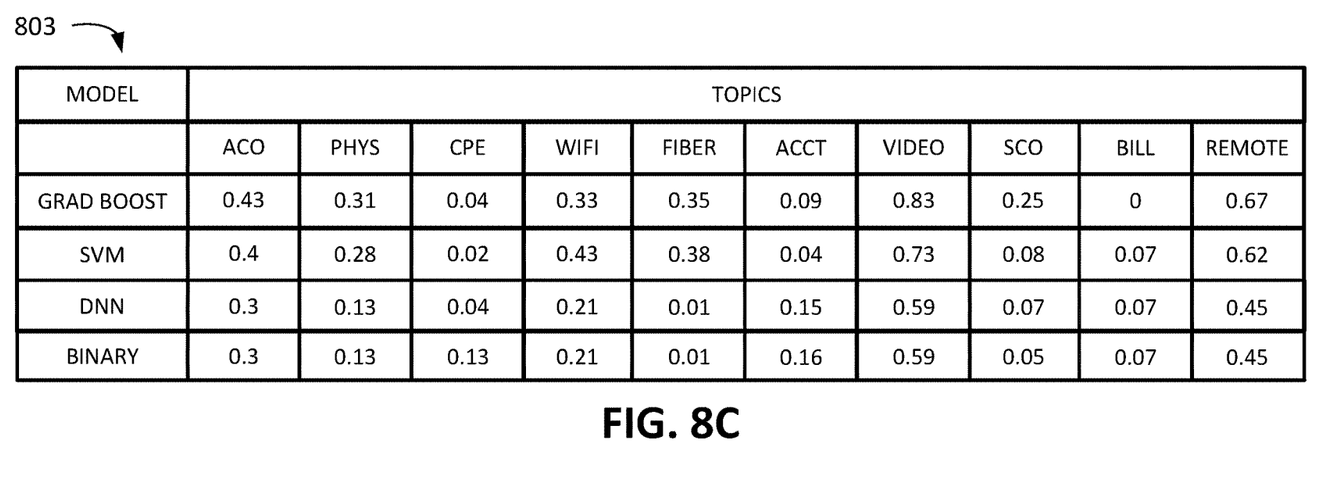
FIG. 8C illustrates an exemplary performance table according to an implementation described herein.

For example, FIG. 8C illustrates an exemplary performance table 803 that may be stored in performance DB 380. As shown in FIG. 8C, performance table 803 may include an F1 score for each multiclass machine learning model for each topic as well as an F1 score for each RE binary classifier associated with a particular topic. In the example of performance table 803, the F1 score for the CPE RE binary classifier is 0.13, while the F1 score for the FIBER RE binary classifier is 0.01. Thus, the CPE RE binary classifier is stronger and classification engine 330 may select the CPE RE binary classifier as being more reliable than the FIBER RE binary classifier. Therefore, for the telephone call associated with likelihood table 802, classification engine 330 may select the CPE topic.

Figure 8D:
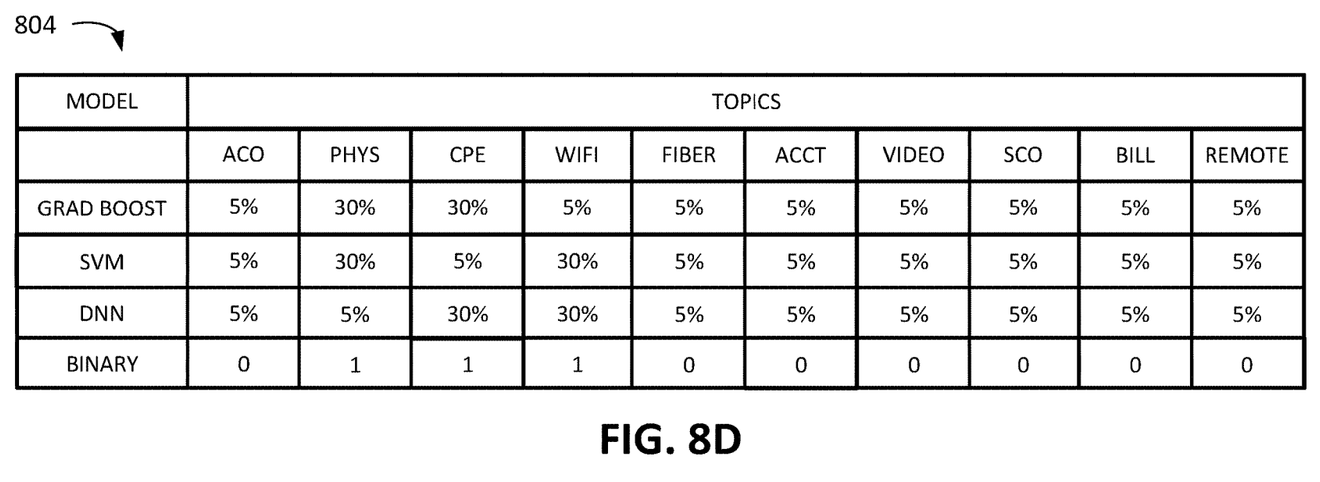
FIG. 8D illustrates a third exemplary likelihood table according to an implementation described herein.

FIG. 8D illustrates a third exemplary likelihood table 804 that may be stored in call DB 340. Likelihood table 804 illustrates an example of a telephone call in which no multiclass machine learning model generates a likelihood score for any topic that is higher than likelihood scores for all other topics and in which it may not be possible to select a single RE binary classifier based on F1 scores associated with each RE binary classifier. For example, the gradient boosting model is not able to distinguish between the PHYS and CPE topics, the SVM model is not able to distinguish between the PHYS and WIFI topics, and the DNN model is not able to distinguish between the CPE and WIFI topics. Furthermore, RE binary classifier module 360 has detected matches for the PHYS topic, the CPE topic, and the WIFI topics. Moreover, returning to performance table 803, the F1 scores for the PHYS RE binary classifier and the CPE binary classifier have the same values, and thus classification engine 330 may not be able to select the strongest RE binary classifier based on the F1 scores for the particular RE binary classifiers alone.

Thus, classification engine 330 may determine the relative strength of each RE binary classifier with respect to the multiclass machine learning models by comparing the F1 scores of a particular RE binary classifier for a topic with the F1 scores of the multiclass machine learning models for the topic. Classification engine 330 may calculate a ratio of the F1 score of the RE binary classifier for the topic with a sum of the F1 scores for all the multiclass machine learning models for the topic. The F1 ratio for the PHYS topic may be calculated as 0.13/(0.31+0.28+0.13)=0.18, the F1 ratio for the CPE topic may be calculated as 0.13/(0.04+0.02+0.04)=1.3, and the F1 ratio for the WIFI topic may be calculated as 0.21/(0.33+0.43+0.21)=0.22. Therefore, even though the RE binary classifiers for the PHYS, CPE, and WIFI topics generated the same output, and even though the F1 scores for the PHYS and CPE topics resulted in the same values (or a difference in values that is less than a threshold difference), classification engine 330 may be able to select the CPE topic as the most likely topic for the telephone call based on the F1 ratio between the F1 score for the CPE RE binary classifier and the sum of F1 scores for the multiclass machine learning models for the CPE topic.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Furthermore, while a series of blocks have been described with respect to FIGS. 5 and 6, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   obtaining, by a computer device, a text file generated based on a communication session;
   selecting, by the computer device, a plurality of topics for classifying communication sessions;
   applying, by the computer device, one or more trained machine learning models to the obtained text file to determine one or more most likely topics, of the plurality of topics, for the communication session;
   applying, by the computer device, a plurality of regular expression binary classifiers, each associated with a set of regular expressions for a different topic of the plurality of topics, to the obtained text file to determine a likelihood the communication session is associated with a particular topic;
   selecting, by the computer device, a topic, of the plurality of topics, for the communication session based on the determined one or more most likely topics and the determined likelihood the communication session is associated with the particular topic; and
   classifying, by the computer device, the communication session based on the selected topic.

2. The method of claim 1, wherein the communication session corresponds to a customer service telephone call.

3. The method of claim 1, wherein applying the plurality of regular expression binary classifiers to the obtained text file includes:
   selecting a particular regular expression binary classifier from the plurality of regular expression binary classifiers, wherein the particular regular expression binary classifier is associated with a particular topic;
   obtaining a plurality of regular expression patterns associated with the particular topic; and
   determining a number of regular expression pattern matches, from the plurality of regular expression patterns, in the obtained text file.

4. The method of claim 1, wherein selecting the topic, of the plurality of topics, for the communication session, based on the determined one or more most likely topics and the determined likelihood the communication session is associated with the particular topic, includes:
   determining that a particular one of the one or more trained machine learning models has generated a likelihood score for a particular one of the plurality of topics that is higher, by at least a threshold amount, than likelihood scores generated for all other ones of the plurality of topics; and
   selecting the particular one of the plurality of topics for the communication session.

5. The method of claim 1, wherein selecting the topic, of the plurality of topics, for the communication session includes:
   determining performance scores for particular ones of the plurality of regular expression binary classifiers;
   determining that a particular regular expression binary classifier, of the plurality of regular expression binary classifiers, is associated with a performance score that is higher, by at least a threshold amount, than performance scores associated with all other ones of the plurality of regular expression binary classifiers; and
   selecting the topic associated with the particular regular expression binary classifier.

6. The method of claim 1, wherein selecting the topic, of the plurality of topics, for the communication session includes:
   determining a first set of performance scores for particular ones of the plurality of regular expression binary classifiers;
   determining a second set of performance scores for particular ones of the one or more trained machine learning models for particular ones of the plurality of topics; and
   selecting the topic based on comparing the first set of performance scores with the second set of performance scores.

7. The method of claim 6, wherein comparing the first set of performance scores with the second set of performance scores includes:
   calculating, for a particular topic, a ratio of a performance score, from the first set of performance scores, for a particular one of the plurality of regular expression binary classifiers associated with the particular topic, and a sum of performance scores, from the second set of performance scores, associated with the particular topic; and
   wherein selecting the topic, of the plurality of topics, for the communication session includes:
   selecting the topic associated with a highest ratio.

8. The method of claim 6, wherein a performance score, of the first or second set of performance scores, for a particular one of the plurality of regular expression binary classifiers or a particular one of the one or more trained machine learning models, is based on a harmonic mean of precision and recall calculated for the particular one of the plurality of regular expression binary classifiers or a particular one of the one or more trained machine learning models.

9. The method of claim 1, wherein the one or more trained machine learning models include at least one of:
   a support vector machines model,
   a gradient boosting model,
   a deep learning neural network model,
   a decision tree model,
   a random forest model,
   a K-nearest neighbors model,
   a nave Bayes model, or
   a self-organizing map model.

10. The method of claim 1, further comprising:
    determining a sentiment for the communication session based on the generated text file,
    determining a promise associated with the communication session based on the generated text file, and
    classifying the communication session further based on the determined sentiment and determined promise.

11. A computer device comprising:
    a memory storing instructions; and
    a processor configured to execute the instructions to:
      obtain a text file generated based on a communication session;
      select a plurality of topics for classifying communication sessions;
      apply one or more trained machine learning models to the obtained text file to determine one or more most likely topics, of the plurality of topics, for the communication session;
      apply a plurality of regular expression binary classifiers, each associated with a set of regular expressions for a different topic of the plurality of topics, to the obtained text file to determine a likelihood the communication session is associated with a particular topic;

select a topic, of the plurality of topics, for the communication session based on the determined one or more most likely topics and the determined likelihood the communication session is associated with the particular topic; and classify the communication session based on the selected topic.

12. The computer device of claim 11, wherein the communication session corresponds to a customer service telephone call or a chat session.

13. The computer device of claim 11, wherein, when applying the plurality of regular expression binary classifiers to the obtained text file, the processor is further configured to:

select a particular regular expression binary classifier from the plurality of regular expression binary classifiers, wherein the particular regular expression binary classifier is associated with a particular topic;

obtain a plurality of regular expression patterns associated with the particular topic; and determine a number of regular expression pattern matches, from the plurality of regular expression patterns, in the obtained text file.

14. The computer device of claim 11, wherein, when selecting the topic, of the plurality of topics, for the communication session, based on the determined one or more most likely topics and the determined likelihood the communication session is associated with the particular topic, the processor is further configured to:

determine that a particular one of the one or more trained machine learning models has generated a likelihood score for a particular one of the plurality of topics that is higher, by at least a threshold amount, than likelihood scores generated for all other ones of the plurality of topics; and select the particular one of the plurality of topics for the communication session.

15. The computer device of claim 11, wherein, when selecting the topic, of the plurality of topics, for the communication session, the processor is further configured to:

determine performance scores for particular ones of the plurality of regular expression binary classifiers;

determine that a particular regular expression binary classifier, of the plurality of regular expression binary classifiers, is associated with a performance score that is higher, by at least a threshold amount, than performance scores associated with all other ones of the plurality of regular expression binary classifiers; and select the topic associated with the particular regular expression binary classifier.

16. The computer device of claim 11, wherein, when selecting the topic, of the plurality of topics, for the communication session, the processor is further configured to:

determine a first set of performance scores for particular ones of the plurality of regular expression binary classifiers;

determine a second set of performance scores for particular ones of the one or more trained machine learning models for particular ones of the plurality of topics; and select the topic based on comparing the first set of performance scores with the second set of performance scores.

17. The computer device of claim 16, wherein, when comparing the first set of performance scores with the second set of performance scores, the processor is further configured to:

calculate, for a particular topic, a ratio of a performance score, from the first set of performance scores, for a particular one of the plurality of regular expression binary classifiers associated with the particular topic, and a sum of performance scores, from the second set of performance scores, associated with the particular topic; and wherein, when selecting the topic, of the plurality of topics, for the communication session, the processor is further configured to:

select the topic associated with a highest ratio.

18. The computer device of claim 11, wherein a performance score, of the first or second set of performance scores, for a particular one of the plurality of regular expression binary classifiers or a particular one of the one or more trained machine learning models, is based on a harmonic mean of precision and recall calculated for the particular one of the plurality of regular expression binary classifiers or a particular one of the one or more trained machine learning models.

19. A non-transitory computer-readable memory device, storing instructions executable by a processor, the non-transitory computer-readable memory device comprising:

one or more instructions to obtain a text file generated based on a communication session;

one or more instructions to select a plurality of topics for classifying communication sessions;

one or more instructions to apply one or more trained machine learning models to the obtained text file to determine one or more most likely topics, of the plurality of topics, for the communication session;

one or more instructions to apply a plurality of regular expression binary classifiers, each associated with a set of regular expressions for a different topic of the plurality of topics, to the obtained text file to determine a likelihood the communication session is associated with a particular topic;

one or more instructions to select a topic, of the plurality of topics, for the communication session based on the determined one or more most likely topics and the determined likelihood the communication session is associated with the particular topic; and one or more instructions to classify the communication session based on the selected topic.

20. The non-transitory computer-readable memory device of claim 19, wherein the one or more instructions to select the topic, of the plurality of topic, further include:

one or more instructions to determine a first set of performance scores for particular ones of the plurality of regular expression binary classifiers;

one or more instructions to determine a second set of performance scores for particular ones of the one or more trained machine learning models for particular ones of the plurality of topics;

one or more instructions to calculate, for a particular topic, a ratio of a performance score, from the first set of performance scores, for a particular one of the plurality of regular expression binary classifiers associated with the particular topic, and a sum of performance scores, from the second set of performance scores, associated with the particular topic; and wherein, the one or more instructions to select the topic, of the plurality of topics, for the communication session, further comprise:
one or more instructions to select the topic associated with a highest ratio.

* * * * *